United States Patent [19]

Blumentritt et al.

[11] Patent Number: 5,052,010
[45] Date of Patent: Sep. 24, 1991

[54] SOLID STATE LASER

[75] Inventors: Martin Blumentritt, Königsbronn; Peter Greve, Essingen; Reiner Kohler, Aalen, all of Fed. Rep. of Germany

[73] Assignee: Carl-Zeiss-Stiftung, Heidenheim, Fed. Rep. of Germany

[21] Appl. No.: 493,770

[22] Filed: Mar. 15, 1990

[30] Foreign Application Priority Data

Mar. 18, 1989 [DE] Fed. Rep. of Germany ... 8903388[U]

[51] Int. Cl.$^5$ ................................................ H01S 3/03
[52] U.S. Cl. ..................................... 372/65; 372/92; 372/72; 372/107
[58] Field of Search ................... 372/92, 72; 378/61, 378/65, 107

[56] References Cited

U.S. PATENT DOCUMENTS

| 3,487,332 | 12/1969 | Cordy, Jr. ............... | 372/72 |
| 3,528,030 | 9/1970 | Bickel et al. ............ | 378/72 |
| 3,577,095 | 5/1971 | Benner .................. | 372/72 |
| 4,232,276 | 11/1980 | Iwata ................... | 378/72 |
| 4,313,092 | 1/1982 | Kaule .................... | 372/70 |
| 4,566,107 | 1/1986 | Kitaura et al. ........... | 372/72 |
| 4,833,682 | 5/1989 | Byer et al. .............. | 372/72 |
| 4,935,938 | 6/1990 | Gressly et al. ........... | 372/65 |

Primary Examiner—Léon Scott, Jr.
Attorney, Agent, or Firm—Walter Ottesen

[57] ABSTRACT

The invention is directed to a solid state laser wherein the pump sources are connected with holding parts and can be seated into a predetermined and reproducible position with mechanical guides and stops. In this way, an exchange of the pump sources is possible without a new adjustment or a readjustment.

16 Claims, 3 Drawing Sheets

SOLID STATE LASER

FIELD OF THE INVENTION

The invention relates to a solid state laser having a laser rod and at least one pump source in a pump chamber having at least two parts.

BACKGROUND OF THE INVENTION

In optically pumped solid state lasers, the laser rod is often seated in a so-called pump chamber having an inner space or cavity which is so configured that the excitation radiation is reflected as completely as possible onto the laser rod. This excitation radiation emanates from one or more pump light sources.

The pump chamber is often attached directly or by means of a base plate to a base frame. The base frame is made of at least three Invar rods and two plates in order to obtain a good thermal stability. The plates fix the precise position of the Invar rods with respect to each other in the vicinity of their ends. The resonator mirror and the output reflector can be attached to the plates. Other components of the laser which may be present are also fixed on these plates or separate plates on at least two of the three Invar rods.

Notwithstanding the configuration described above, these solid state lasers have the disadvantage that the exchange of a component is inconvenient and/or the laser must be again adjusted or at least readjusted after the exchange of the component. This is especially disturbing for the exchange of the pump sources since their service life is often relatively short.

SUMMARY OF THE INVENTION

It is an object of the invention to provide a solid state laser wherein the exchange of the pump sources can be carried out with the least possible complexity and wherein no adjusting work is required.

The solid state laser of the invention includes: a first part and a second part mounted on the first part to conjointly define a pump chamber therewith; a laser rod mounted in the chamber; at least one pump source; movable holding parts for holding the pump source; and, mechanical guide and stop means for coacting with the holding parts and the pump source to permit the pump source to be seated in the pump chamber in a predetermined and reproducible position relative to the laser rod.

In this way, the pump sources too are placed in a predetermined position with respect to the laser rod. By the predetermined position is meant the correct position in the pump chamber and this is achieved in that the pump chamber and the holding parts together with the pump sources are matched to each other with sufficient precision with respect to their mechanical dimensions.

According to another feature of the invention, the end walls of the lower part of the pump chamber, the cutouts in these end walls and the surface of the base plate on which the lower part of the pump chamber is seated are utilized as the mechanical guides and stops for the holding parts.

According to another advantageous embodiment of the invention, the holding parts are configured to have a channel for a coolant throughflow from the base plate to the pump source and from the pump source back to the base plate. The holding parts are also configured to have receiving means for receiving a glass tube for the coolant throughflow about and along the pump source.

A special advantage of the invention is that not only the same pump sources can be exchanged in a simple manner and without readjustment, but that with appropriately configured holding parts having the same connecting dimensions for the mechanical guides and stops, also different pump sources such as from various manufacturers can be exchanged.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
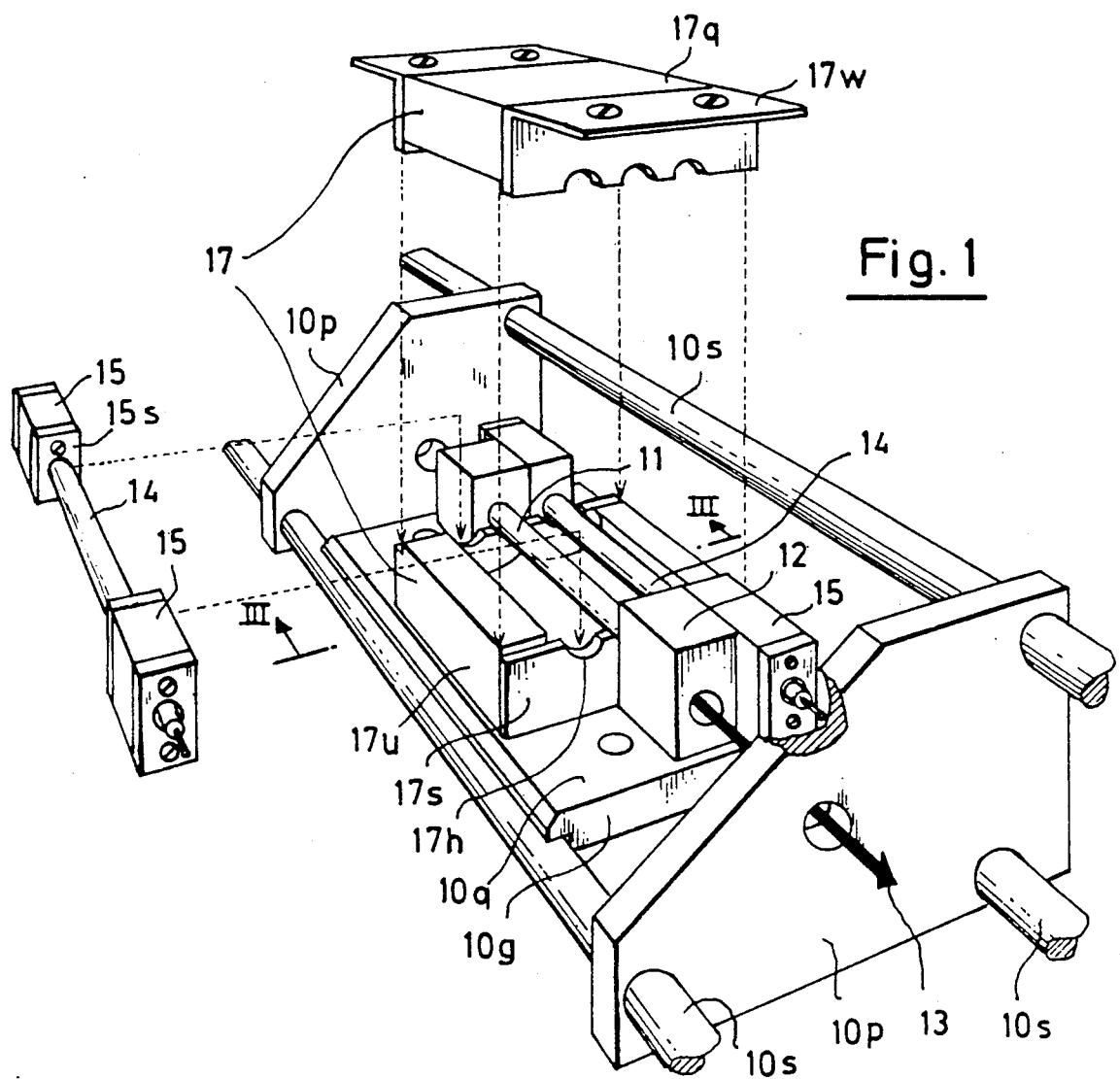
FIG. 1 is an exploded view of the solid state laser according to an embodiment of the invention.

In FIG. 1, the basic frame of a known laser arrangement is shown which includes three Invar rods 10s and two plates 10p. A base plate 10g which is also known per se is attached to the two lower Invar rods. A two-part known pump chamber 17 is seated on the base plate 10g and has an upper part 17q which can be taken off upwardly as shown; whereas, the lower part 17u remains tightly connected to the base plate 10g.

Figure 2:
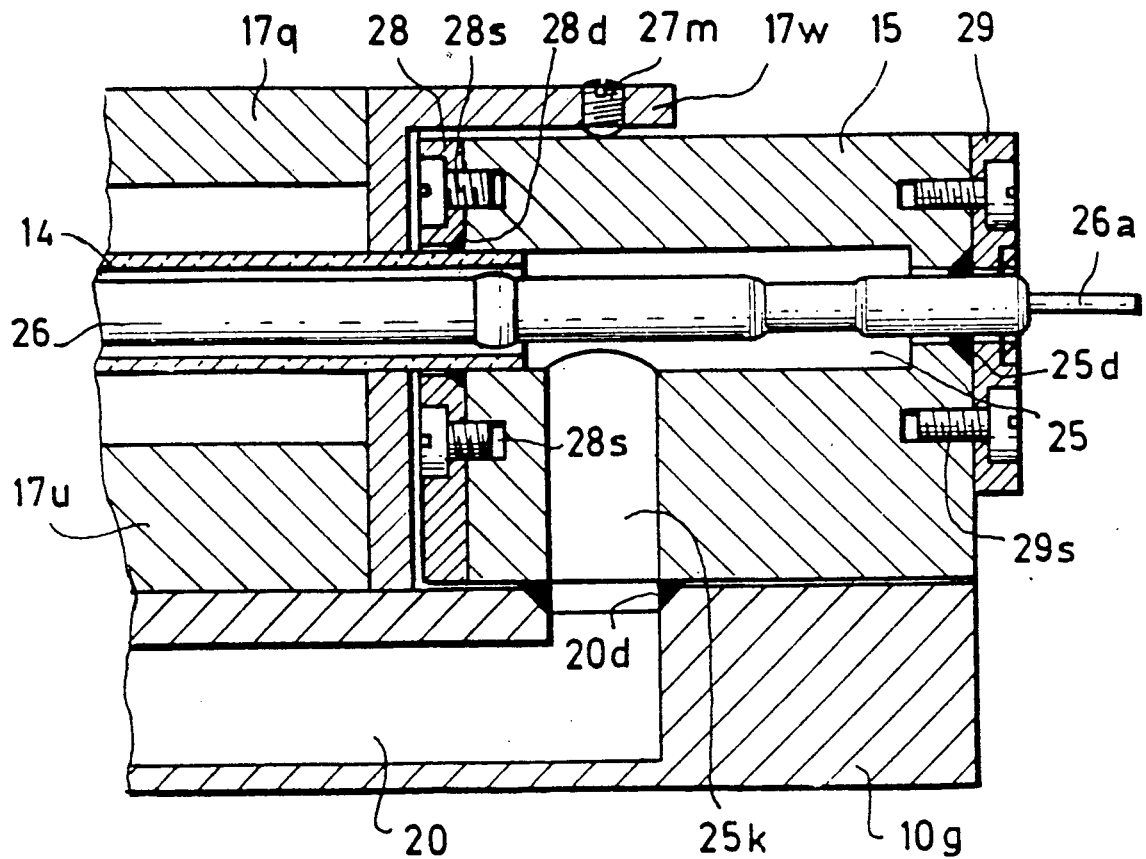
FIG. 2 is a section view taken through the end portion of the frame-like structure and one holding part for a pump source.
Figure 3A:
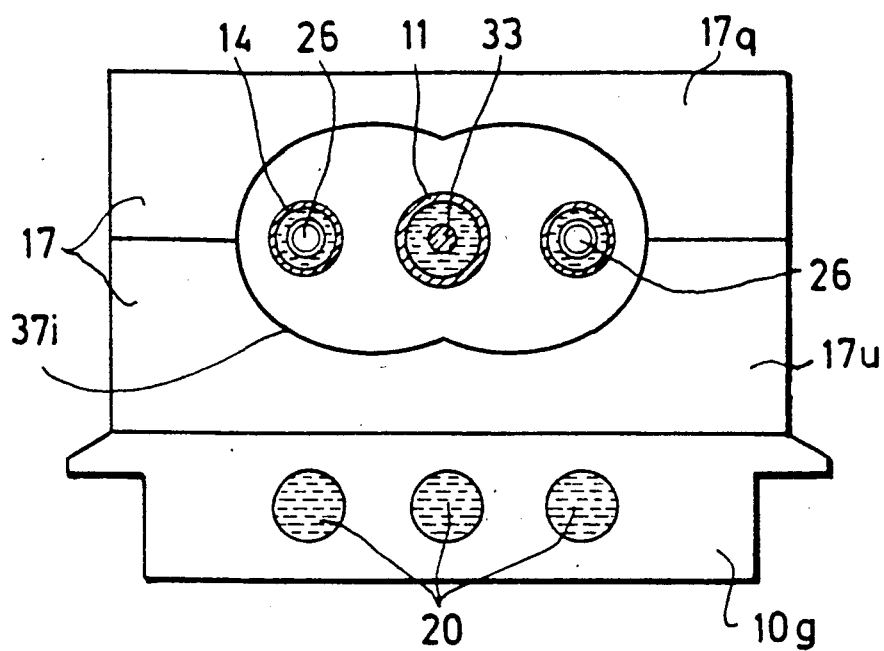
FIG. 3a is a view taken along line III—III of FIG. 1 with both pump sources in place and shows one embodiment of a pump chamber; and, FIG. 3b is an elevation view, partially in section, showing an alternate embodiment of a pump chamber.

In the embodiment shown in FIG. 1 and as shown in FIG. 3a, the laser rod 33 is shown within a glass tube 11 through which cooling water flows. The laser rod 33 transmits the laser beam 13. The pump sources 26 are likewise disposed in glass tubes 14, respectively, through which cooling water flows. The pump sources 26 are needed for exciting the laser beam. The pump sources 26 and the glass tubes 14 are connected to holding parts 15 as will be described below in more detail with respect to FIG. 2. With these holding parts 15, the pump sources 26 and the glass tubes 14 can be taken out and seated as shown in FIG. 1 when the upper part 17q of the pump chamber is first removed.

During placement, the pump sources 26 are placed in a precisely defined position relative to the pump chamber 17 and therefore with respect to the laser rod 33 in the following manner. The glass tube 14 is guided into the end walls 17s of the pump chamber 17 by the semi-circularly-shaped cutouts 17h. The guidance in the direction of the axis of the glass tube 14 occurs in that the spacing of the end faces 15s of the holding parts 15 corresponds precisely to the outer distance of the end walls 17s of the pump chamber 17. And finally, the glass tube 14 seats in the holding parts 15 at such an elevation that, when the holding parts 15 sit upon the surface 10q of the base plate 10g, the axis of the glass tube 14 and thereby also the axis of the pump source 26, arrive precisely in the correct elevation in the pump chamber 17.

The holding parts 15 can also have adjustable contact faces such as at their end faces 15s in order to compensate for manufacturing deviations in the position of the electrodes in the pump sources. Often however, an adequately precise manufacture of the corresponding mechanical parts is sufficient.

The precise configuration of the holding parts 15 is shown in FIG. 2. The glass tube 14 is seated with some clearance in the bore 25 and is tightly clamped by the sealing ring 28d when the plate 28 is fastened with screws 28s. The pump source 26 seated in the glass tube 14 without contact to the plate is clamped at the outer end of the holding part 15 by the sealing ring 25d when the plate 29 is fastened with screws 29s. At the connection 26a, the electric current supply is connected, for example, by a conventional insert contact or by a terminal screw.

The holding parts 15 also contain a channel 25k for the cooling liquid necessary during operation. The cooling liquid is conducted from and to the base plate 10g by the cooling channel 20. A sealing ring 20d is disposed at the interface between the base plate 10g and the holding part 15. The holding part 15 is pressed against the sealing ring 20d when the upper part 17q of the pump chamber 17 with the angle piece 17w and the adjustable set screw 27m are placed in position.

The ancillary holding parts 12 for the laser rod 33 and the glass tube 11 are correspondingly configured. In contrast to the holding parts 15 for the pump sources 26, the ancillary holding parts 12 are however permanently and precisely fixed on the base plate 10g by screws (not shown).

Different pump chambers can be seated on the base plate 10g. FIG. 3a corresponds to the embodiment of FIG. 1 and shows a pump chamber 17 for two pump sources 26. The inner chamber 37i defines a known double ellipse when viewed in cross section. The pump sources 26 are arranged in the outer focal points and the laser rod 33 is arranged in the common inner focal point.

Figure 3B:
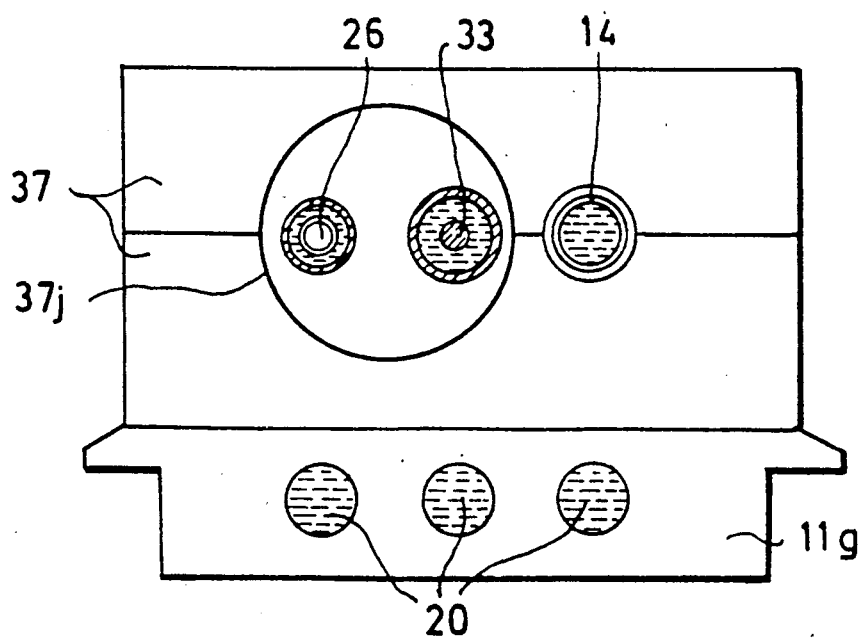

FIG. 3b shows another embodiment of the pump chamber 37 wherein only one pump source 26 is utilized. In this case, the inner chamber 37j has a circularly-shaped or elliptically-shaped cross section. If the same base plate 10g shown in FIGS. 1 and 3a is used, only a glass tube 14 with corresponding holding parts must be utilized in lieu of the second pump source because of the cooling channels 20 present in this base plate.

The configuration described above permits not only the use of different pump chambers but also allows for a convenient exchange between different laser rods 33 together with their holding parts 12. The primary advantage of the configuration described above is however that the pump sources can be simply exchanged without a new adjustment or a readjustment being required since the exchange of the pump sources does not influence the adjustment of the laser rod 33 in the resonator. Furthermore, different pump sources even from different manufacturers can be used by means of corresponding holding parts having the same connecting dimensions for the mechanical guides and stops (17h, 17s, 10q) without a change being necessary in the remaining assembly.

The base plate 10g can be produced in different lengths with its components mounted thereon so that different energy classes are possible. Furthermore, additional components such as acousto-optical modulators, frequency doublers, fiber in-couplers and shutters can be used in the basic frame comprising the Invar rods 10s and the plates 10p so that different systems can be assembled by means of the modular assembly.

It is understood that a corresponding assembly is also possible without a cooling arrangement.

It is understood that the foregoing description is that of the preferred embodiments of the invention and that various changes and modifications may be made thereto without departing from the spirit and scope of the invention as defined in the appended claims.

What is claimed is:

1. A solid state laser apparatus having an optical axis, the laser apparatus comprising:

a lower part and an upper part mounted on said lower part to conjointly define a pump chamber therewith;

a laser rod mounted in said chamber and defining said optical axis;

said upper part being seated on said lower part so as to be removable therefrom in a direction transverse to said optical axis to clear said lower part so as to permit access to said lower part from above;

at least one elongated pump source defining a longitudinal pump source axis and having respective end portions;

two holding parts for holding said pump source and being mounted at respective ones of said end portions, said holding parts and said pump source conjointly defining a pump source assembly movable relative to said lower part when placed on said lower part while said upper part is removed;

said holding parts being separated a predetermined distance from each other and extending outwardly beyond said pump source in a direction transverse to said pump source axis for coacting with said lower part to permit said pump source to be seated in said pump chamber in a predetermined reproducible position relative to said lower part in the direction of said pump source axis; and, locating means provided in said lower part for receiving and locating said pump source in a predetermined and reproducible position relative to said laser rod when said pump source assembly is lowered and placed on said lower part of said chamber.

2. A solid state laser comprising:

a first part and a second part mounted on said first part to conjointly define a pump chamber therewith;

a laser rod mounted in said chamber;

at least one pump source, holding parts for holding the pump source, said holding parts and the pump source defining a unit movable relative to said first part when placed in said chamber; and, mechanical guide and stop means for coacting with said holding parts and said pump source to permit said pump source to be seated in said pump chamber in a predetermined and reproducible position relative to said laser rod when said unit is placed in said chamber;

a frame-like structure having a base plate defining a surface;

said lower part of said pump chamber being seated on said surface of said base plate;

said laser rod defining a longitudinal axis and said lower part having two end walls defining respective planes transverse to said axis; and, said mechanical guide and stop means including: cutout means formed in said end walls for receiving said pump source therein; and, said end walls and said surface for receiving said holding parts when said pump source is placed in said chamber.

3. The solid state laser of claim 2, said pump source being a first pump source; said holding parts having connecting dimensions adapted to coact with said mechanical guide and stop means; and, said solid state laser further comprising: an additional set of holding parts for holding a replacement pump source different from said first pump source; and, said additional parts also having said connecting dimensions thereby facilitating an exchange of said first pump source for said replacement pump source in said pump chamber.

4. The solid state laser apparatus of claim 1, wherein said lower part has two mutually adjacent walls extending transversely to said axes; and, said predetermined distance being selected so as to cause said holding parts to contact engage said walls, respectively, as said two holding parts are lowered onto said lower part.

5. The solid state laser apparatus of claim 4, said predetermined distance being selected so as to permit said holding parts to straddle said mutually adjacent walls.

6. The solid state laser apparatus of claim 4, said locating means including two cutouts formed in corresponding ones of said mutually adjacent walls.

7. A solid state laser apparatus having an optical axis, the laser apparatus comprising:
   a lower part and an upper part mounted on said lower part to conjointly define a pump chamber therewith;
   a laser rod mounted in said chamber and defining said optical axis;
   said upper part being seated on said lower part so as to be removable therefrom in a direction transverse to said optical axis to clear said lower part so as to permit access to said lower part from above;
   at least one elongated pump source defining a longitudinal pump source axis and having respective end portions;
   two holding parts for holding said pump source and being mounted at respective ones of said end portions;
   said holding parts and said pump source conjointly defining a pump source assembly movable relative to said lower part when placed on said lower part while said upper part is removed;
   said holding parts being separated a predetermined distance from each other for coacting with said lower part to permit said pump source to be seated in said pump chamber in a predetermined position relative to said lower part in the direction of said pump source axis;
   locating means provided in said lower part for receiving and locating said pump source in a predetermined and reproducible position relative to said laser rod while said upper part is removed;
   a frame-like structure having a base plate defining a surface;
   a glass tube disposed in surrounding relationship to said pump source for conducting a coolant therealong;
   said holding parts being seated on said surface of said base plate when said assembly is placed on said lower part and including respective receiving means for receiving said glass tube therein; and,
   first channel means formed in said holding parts and second channel means formed in said base plate so as to communicate with said first channel means for passing said coolant between said base plate and said glass tube for cooling said pump source when said holding parts are mounted on said base plate.

8. A solid state laser apparatus having an optical axis, the laser apparatus comprising:
   a lower part and an upper part mounted on said lower part to conjointly define a pump chamber therewith;
   a laser rod mounted in said chamber and defining said optical axis when seated in said chamber;
   said upper part being seated on said lower part so as to be removable therefrom in a direction transverse to said axis so as to permit placing said laser rod into said lower part also in a direction transverse to said optical axis;
   at least one pump source defining a longitudinal pump source axis and having respective end portions;
   two holding parts for holding said pump source and being mounted at respective ones of said end portions;
   said holding parts and said pump source conjointly defining a pump source assembly movable relative to said lower part when placed on said lower part while said upper part is removed;
   said holding parts being separated a predetermined distance from each other for and extending outwardly beyond said pump source in a direction transverse to said pump source axis for coacting with said lower part to permit said pump source to be seated in said pump chamber in a predetermined position relative to said lower part in the direction of said pump source axis;
   locating means provided in said lower part for receiving and locating said pump source in a predetermined and reproducible position relative to said laser rod when said pump source assembly is lowered and placed on said lower part of said chamber;
   a frame-like structure having a base plate defining a surface;
   said pump source being a first pump source and said solid state laser apparatus also including a second pump source;
   said lower part and said upper part conjointly defining a first pump chamber seatable on said surface of said base plate; said first pump chamber having a first reflecting inner surface for said first pump source; and,
   said solid state laser apparatus further including: a second lower part and a second upper part conjointly defining a second pump chamber seatable on said surface in lieu of said first pump chamber; and, said second pump chamber having a second reflecting inner surface for said first and second pump sources.

9. A solid state laser apparatus having an optical axis, the laser apparatus comprising:
   a lower part and an upper part mounted on said lower part to conjointly define a pump chamber therewith;
   a laser rod removably mounted in said chamber and defining said optical axis when seated in said chamber;
   said upper part being seated on said lower part so as to be removable therefrom in a direction transverse to said axis so as to permit placing said laser rod into said lower part also in a direction transverse to said optical axis;

at least one pump source defining a longitudinal pump source axis and having respective end portions;

two holding parts for holding said pump source and being mounted at respective ones of said end portions;

said holding parts and said pump source conjointly defining a pump source assembly movable relative to said lower part when placed on said lower part while said upper part is removed;

said holding parts being separated a predetermined distance from each other and extending outwardly beyond said pump source in a direction transverse to said pump source axis for coacting with said lower part to permit said pump source to be seated in said pump chamber in a predetermined position relative to said lower part in the direction of said pump source axis;

locating means provided in said lower part for receiving and locating said pump source in a predetermined and reproducible position relative to said laser rod when said pump source assembly is lowered and placed on said lower part of said chamber; and, two ancillary holding parts for replaceably holding said laser rod in said chamber.

10. A solid state laser comprising:

a first part and a second part mounted on said first part to conjointly define a pump chamber therewith;

a laser rod mounted in said chamber;

at least one pump source, movable holding parts for holding the pump source;

mechanical guide and stop means for coacting with said holding parts and said pump source to permit said pump source to be seated in said pump chamber in a predetermined and reproducible position relative to said laser rod;

two ancillary holding parts for replaceably holding said laser rod in said chamber;

a frame-like structure having a base plate defining a surface;

a laser rod glass tube disposed in surrounding relationship to said laser rod for conducting a coolant therealong; and, channel means formed in said ancillary holding parts and said base plate for passing said coolant between said base plate and said glass tube for cooling said laser rod.

11. The solid state laser of claim 10, further comprising:

a pump source glass tube disposed in surrounding relationship to said pump source for conducting a pump source coolant therealong; said holding parts for holding said pump source being pump source holding parts and being mountable on said surface of said base plate and including respective receiving means for receiving said pump source glass tube therein; and, pump source channel means formed in said pump source holding parts and said base plate for passing said pump source coolant between said base plate and said pump source glass tube for cooling said pump source; first pressed sealing means arranged in said pump source holding parts for holding said pump source in said pump source holding parts and second pressed sealing means arranged in said pump source holding parts for holding said pump source glass tube in said pump source holding parts; third pressed sealing means arranged in said ancillary holding parts for holding said laser rod in said ancillary holding parts; and, fourth pressed sealing means arranged in said ancillary holding parts for holding said laser rod in said ancillary holding parts.

12. A solid state laser comprising:

a first part and a second part mounted on said first part to conjointly define a pump chamber therewith;

a laser rod mounted in said chamber;

at least one pump source;

movable holding parts for holding the pump source;

mechanical guide and stop means for coacting with said holding parts and said pump source to permit said pump source to be seated in said pump chamber in a predetermined and reproducible position relative to said laser rod;

a frame-like structure having a base plate defining a surface;

a glass tube disposed in surrounding relationship to said pump source for conducting a coolant therealong;

said holding parts being mountable on said surface of said base plate and including respective receiving means for receiving said glass tube therein;

channel means formed in said holding parts and said base plate for passing said coolant between said base plate and said glass tube for cooling said pump source;

said holding parts and said base plate conjointly defining an interface and sealing means being disposed at said interface for sealing said channel means at said interface to prevent leakage of coolant therefrom;

said first part being a lower part of said pump chamber and being seated on said surface of said base plate and said second part being an upper part displaceable relative to said lower part; and, said upper part having means for engaging said holding parts and pressing said holding parts against said sealing means when said upper part is seated on said lower part.

13. A solid state laser apparatus having an optical axis, the laser apparatus comprising:

a lower part and an upper part mounted on said lower part to conjointly define a pump chamber therewith;

a laser rod removably mounted in said chamber and defining said optical axis when seated in said chamber;

said upper part being seated on said lower part so as to be removable therefrom in a direction transverse to said axis so as to permit placing said laser rod into said lower part also in a direction transverse to said optical axis;

at least one elongated pump source defining a longitudinal axis;

two holding parts for holding the pump source;

said two holding parts being separated by a predetermined distance from each other and being movable with said pump source relative to and mountable on said lower part while said upper part is removed;

said lower part and said two holding parts conjointly defining first and second interface stop means for positioning said pump source in the direction of said longitudinal axis as said holding parts and said pump source are mounted on said lower part; and, locating means formed in said lower part for coacting with said pump source to position said pump source at a predetermined lateral distance from said laser rod whereby said pump source is seated in said pump chamber in a predetermined and precisely reproducible position relative to said laser rod.

14. The solid state laser apparatus of claim 13, wherein said lower part has two mutually adjacent walls extending transversely to said axes; and, said predetermined distance being selected so as to cause said holding parts to contact engage said walls, respectively, as said two holding parts are lowered onto said lower part.

15. The solid state laser apparatus of claim 14, said predetermined distance being selected so as to permit said holding parts to straddle said mutually adjacent walls.

16. The solid state laser apparatus of claim 14, said locating means including two cutouts formed in corresponding ones of said mutually adjacent walls.

* * * * *